United States Patent [19]
Weaver et al.

[11] Patent Number: 5,523,954
[45] Date of Patent: Jun. 4, 1996

[54] REALTIME MATCHING SYSTEM FOR SCANNING AND SORTING DOCUMENTS

[75] Inventors: William A. V. Weaver, Plano; Jerry E. Edwards, Roanoke; Larry E. Holm, Irring, all of Tex.

[73] Assignee: Document Processing Technologies, Inc., Carrollton, Tex.

[21] Appl. No.: 91,163

[22] Filed: Jul. 13, 1993

[51] Int. Cl.[6] .............................. G06F 17/30; B07C 5/10
[52] U.S. Cl. ..................... 364/478; 209/552; 209/576
[58] Field of Search ......................... 364/478, 464.02; 209/552, 559, 576; 382/209; 371/25.1

[56] References Cited

U.S. PATENT DOCUMENTS

| | | | |
|---|---|---|---|
| 3,622,995 | 11/1971 | Dilks et al. | 364/407 |
| 3,645,392 | 2/1972 | Chittenden et al. | 209/565 |
| 4,026,642 | 5/1977 | Tanaka et al. | 364/400 |
| 4,058,217 | 11/1977 | Vaughan et al. | 209/559 |
| 4,181,948 | 1/1980 | Jackson et al. | 364/478 |
| 4,547,856 | 10/1985 | Piotroski et al. | 364/478 |
| 4,610,359 | 9/1986 | Müller | 209/576 |
| 4,744,035 | 5/1988 | Hashim | 364/470 |
| 4,760,526 | 7/1988 | Takeda et al. | 364/478 |
| 4,800,506 | 1/1989 | Axelrod et al. | 364/478 |
| 4,862,386 | 8/1989 | Axelrod et al. | 364/478 |
| 4,921,109 | 5/1990 | Hasuo et al. | 209/552 |
| 4,953,841 | 9/1990 | Polarek | 270/58 |

*Primary Examiner*—Paul P. Gordon
*Attorney, Agent, or Firm*—Troy J. Cole

[57] ABSTRACT

A method for scanning and sorting documents which employs data not found on the document to make the sorting decision. Provision is also made for correcting misread information with the most probable correct data so that the scanning and sorting process may continue uninterrupted. In one form, the method comprises the steps of: (a) reading first data from a document by optical character recognition; (b) accessing second data which contains a list of valid first data; (c) determining if said data contains an error based on said second data; (d) accessing third data if said first data contains an error, said third data containing a probable correction of said first data; (e) changing said first data to equate with said third data; (f) retrieving fourth data from a data file based upon said first; (g) sorting said document based upon said fourth data.

6 Claims, 19 Drawing Sheets

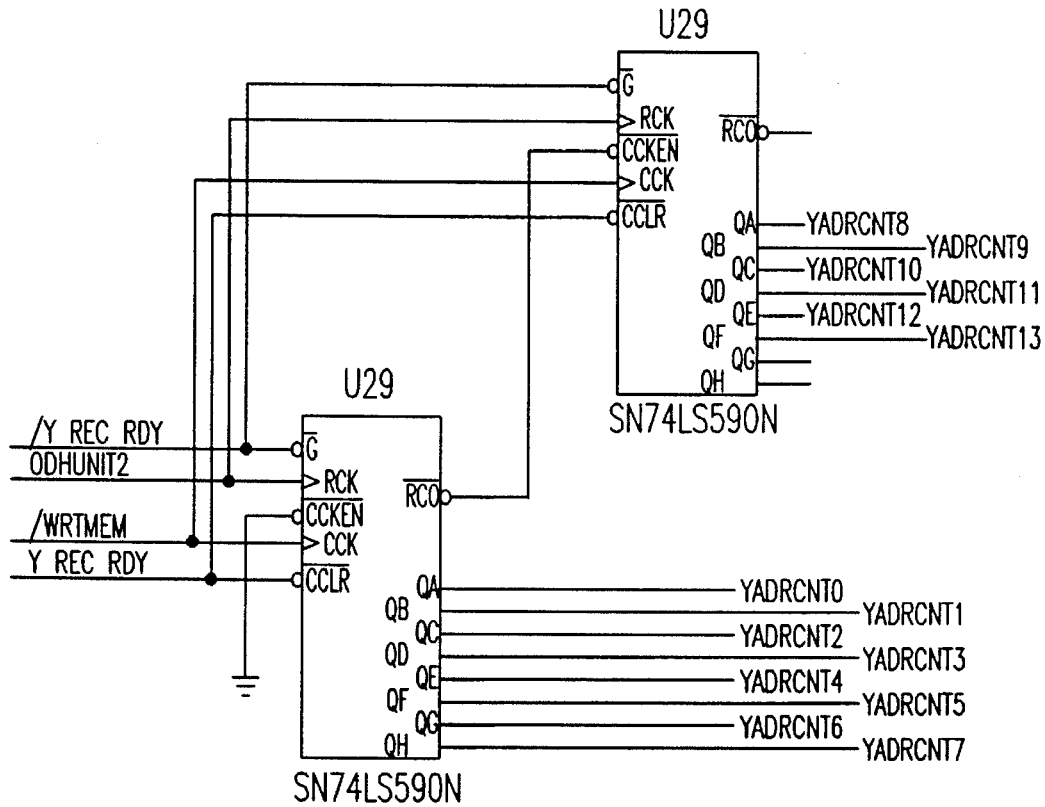
Fig. 12
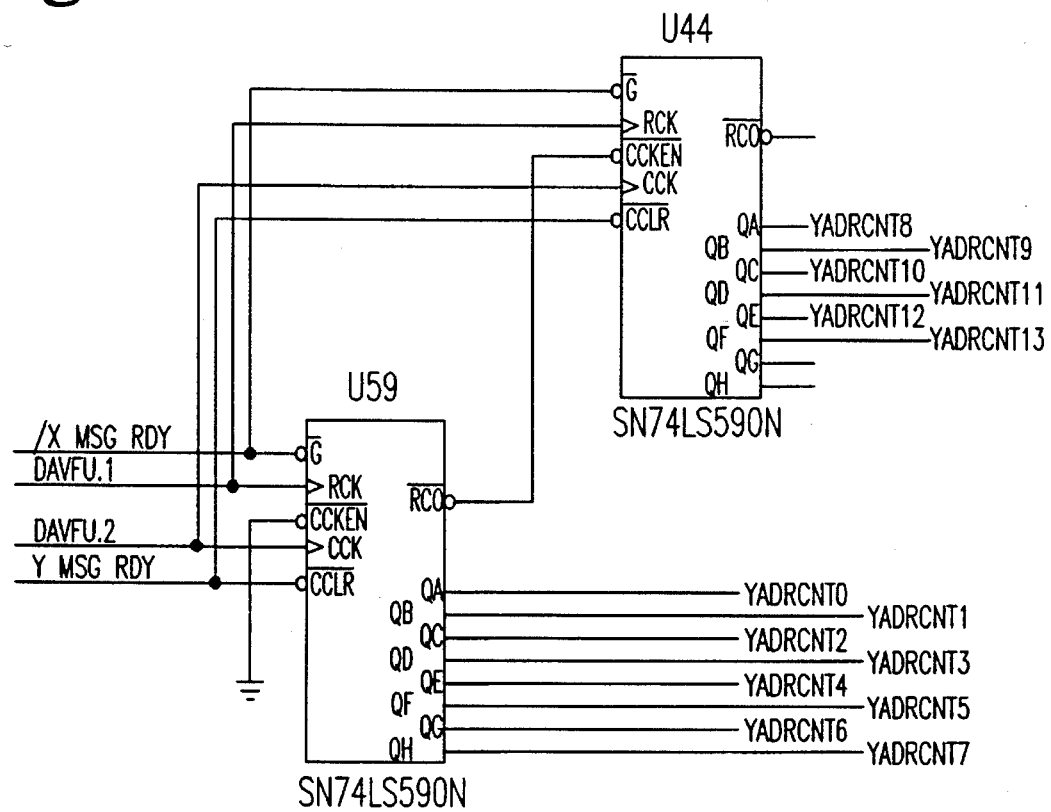

BASE ADDRESS D200 _ UNIT 1 _ SERVER TO HARRIS

REALTIME MATCHING SYSTEM FOR SCANNING AND SORTING DOCUMENTS

TECHNICAL FIELD OF THE INVENTION

The present invention generally relates to database matching systems and more particularly to efficient matching of scanned airline ticket data with information in a sales database.

BACKGROUND OF THE INVENTION

In the airline industry, tickets for airline flights of one airline may be sold through the reservation and ticketing system of another airline. The ticketing airline collects the airfare from the passenger and this airfare is transferred to the carrier airline only after the ticket has been redeemed. The carrier airline is obviously interested in collecting this airfare as soon after the flight as possible.

In prior art systems, sales information (data relating to what fare has been collected for each ticket number, etc.) is gathered by each airline from various ticketing entities. Tickets collected from passengers at the time of boarding are sent to a sorting center and these tickets are run through a high speed optical character recognition (OCR) scanning device. More than 100,000 tickets are typically scanned each day at the sorting center. FIG. 1 illustrates a typical airline ticket, indicated generally at 10. Each ticket 10 includes a unique ticket number 12 near the ticket's lower edge. As illustrated in FIG. 2, the OCR scanner 20 optically reads and captures the ticket number 12 from each ticket 10 and stores this information in a local computer 22 coupled to the OCR scanner 20 via dedicated local link 23.

After a quantity of tickets 10 have been scanned, they are temporarily stored and the data in the OCR scanner's local computer 22 is transmitted to the remotely located mainframe computer 24 which contains the sales database. This transmission occurs over normal subscriber long-distance telephone lines, over a dedicated telephone line, or by magnetic tape (hand carried) as indicated by the dashed line 25. This transmission typically occurs overnight. The sales database in the mainframe computer 24 is compiled from information provided to the mainframe computer 24 from ticket issuers 26 via telephone line 27. The mainframe computer 24 then matches each ticket number 12 with the sales information in the sales database in order to determine the revenue value for each ticket. This matching is required so that the carrier airline can transfer unearned revenue to earned revenue (unearned revenue is from sale of the ticket, earned revenue is from usage of the ticket). A new computer data file is created which contains the ticket number 12 for which the mainframe computer has sales data. Ticket numbers 12 which do not match the ticket number data in the sales database are recorded in another new data file. The non-matching ticket numbers 12 usually result from late sales reporting (sales data can be received two weeks to two months after the first ticket usage).

Therefore, the data file containing the unmatched ticket numbers 12 is transmitted back to the local computer 22 at the OCR scanner 20 site via line 25. The original tickets 10 are then removed from temporary storage and rescanned, so that the OCR scanner 22 can separate them into different stacks 28 depending upon whether a match was made between the ticket number 12 and the sales database information. As the OCR scanner 20 reads the ticket number 12 for the second time, the local computer 22 accesses the new data file (matched and unmatched numbers), and if the currently scanned ticket number 12 is one of the ticket numbers which did not match, that ticket 10 is segregated into a separate stack 28. These non-matching tickets 10 may then be manually keyed into the local computer 22 by a human operator. This manually keyed sales data is then transmitted over line 25 to mainframe computer 24 to recognize revenue as earned revenue.

It is obviously undesirable to have to scan each ticket twice, but this is required because prior art computing methods and hardware cannot match the scanned ticket number 12 to the sales database fast enough to keep up with the desired scanning speeds (typically 1000 tickets 10 per minute). If the scanning device 20 and associated local computer 22 were able to match the ticket number 12 to its sales data during the scanning process (i.e. in real time), the second scanning operation could be entirely eliminated. This would result in at least a 50% efficiency improvement.

SUMMARY OF THE INVENTION

It is therefore an object of the present invention to provide a means for searching a database at a high enough rate in order to allow real time matching of information generated by a high speed OCR scanning device.

In one form of the invention, a method for scanning and sorting documents is disclosed, comprising the steps of (a) reading first data from a document by optical character recognition; (b) retrieving second data from a data file based upon the first data; and (c) sorting the document based upon the second data.

In another form of the invention, a two-way communication link is disclosed for transferring blocks of data between two processing devices without interrupting the process being performed by either device. The blocks of data are stored in temporary memory devices accessible to both processing devices, so that a mailbox system is operated between them.

BRIEF DESCRIPTION OF THE DRAWINGS

The novel features of the present invention are described in the accompanying Detailed Description, with reference to the accompanying drawings, in which:

FIG. 12 is a schematic circuit diagram of a preferred embodiment of the memory address counter of the present invention;

DETAILED DESCRIPTION OF THE DRAWINGS

Figures 1, 2:
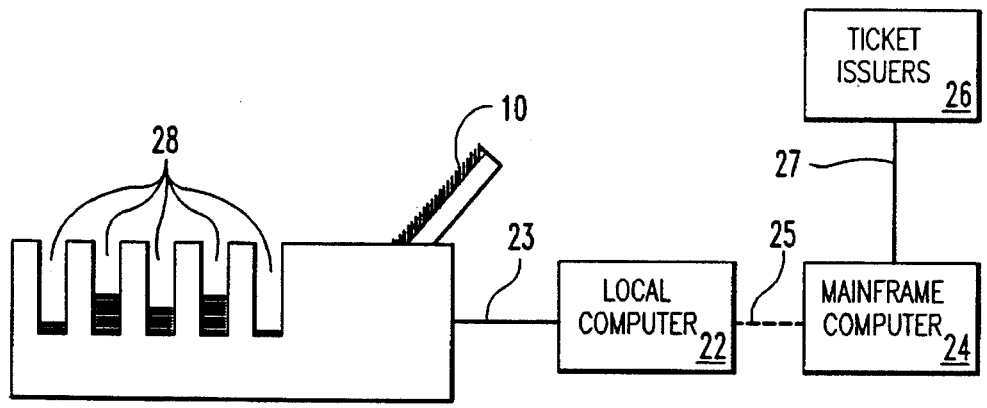
FIG. 1 is a typical airline ticket coupon.
FIG. 2 is a schematic diagram of a prior art OCR scanning system.
Figure 3A:
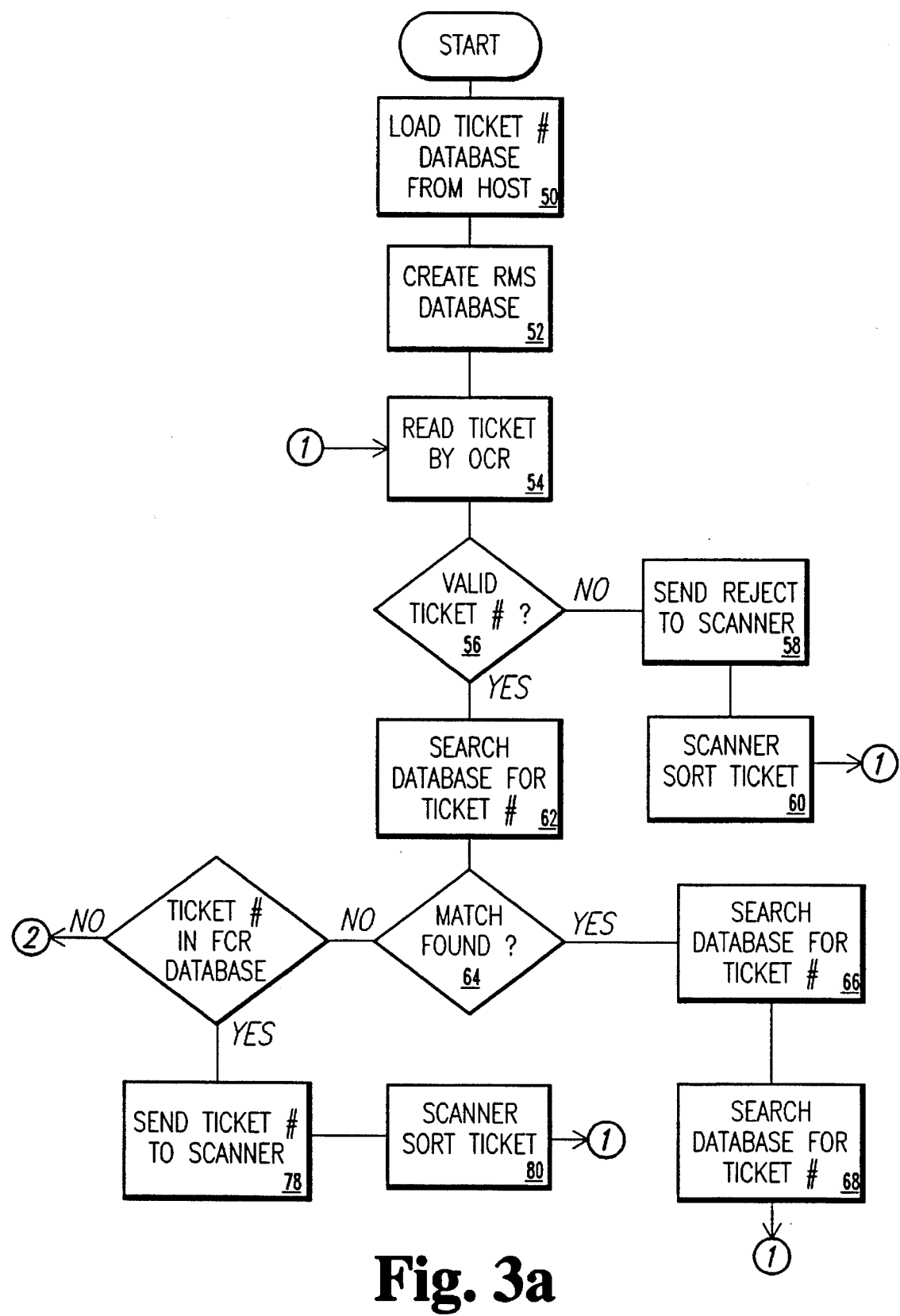
FIG. 3a and 3b are a process flow diagram of a real time matching system of the present invention.
Figure 3B:
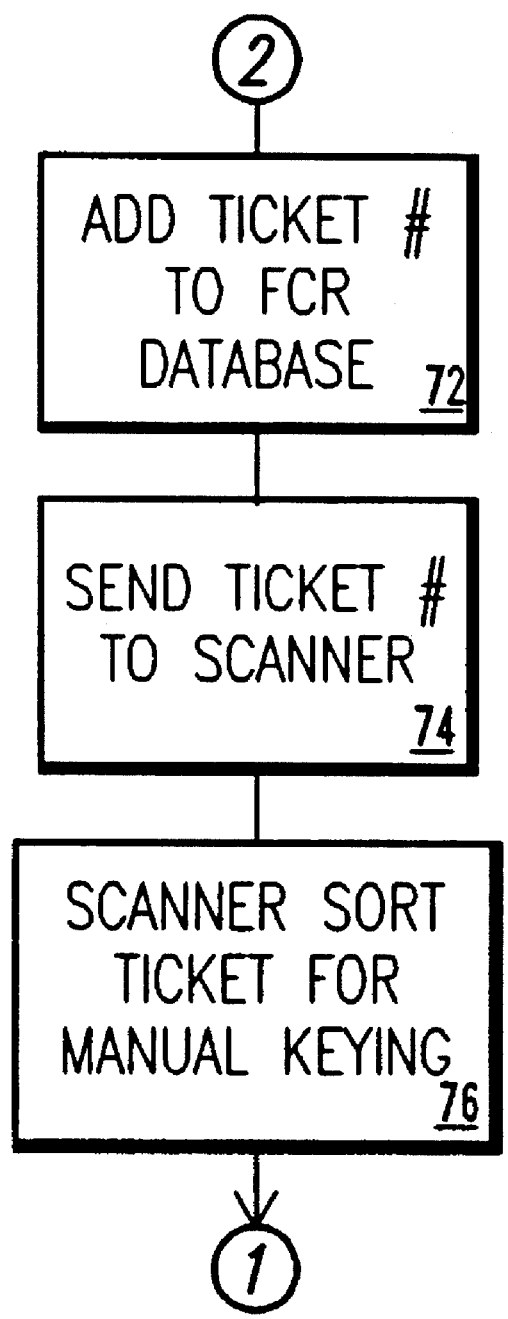

Referring now to FIG. 3, there is illustrated a flowchart of the realtime matching system (RMS) of the present invention. The RMS allows the ticket presently being scanned by the OCR scanner 20 to be sorted into the appropriate stack 28 on the first time through the scanner 20. This is made possible by the improved sorting and matching process employed by the RMS as illustrated by FIG. 3. Beginning at step 50, the file SALE_DAT is downloaded from the host mainframe computer 24 maintained by the airline. The file SALE_DAT contains a list of ticket numbers 12 for which the airline has sales data. In other words, the airline knows what quantity of revenue is represented by each of the ticket numbers 12 listed in SALE_DAT. Immediately after downloading SALE_DAT from the host mainframe 24, RMS validates that the file is sorted into ascending order by ticket number 12.

At step 52, the RMS database is compiled into the file SALE_PRI.MRG along with information from several other files also received from the host mainframe computer 24. ADDEL.NEW is a file that contains ticket numbers 12 for which sales data has been received by the host since the last update of SALE_DAT. ADDEL.NEW also contains ticket numbers 12 for which all issued coupons have been received by the host. Each ticket 10 contains a coupon for each leg of the flight, therefore a two-way direct flight would require two coupons per ticket 10. Once the host receives both coupons for such a flight, the ticket number 12 is put into the ADDEL.NEW file so that the RMS may delete this ticket number 12 from the database (since there will be no more coupons redeemed for this ticket number 12, there is no reason to keep it in the database).

Another file merged into SALE_PRI.MRG is AIRLINE.DAT, which contains the airline code (a unique 3 digit code assigned to each airline), the default check digit method employed (there is a check digit in each ticket number 12 that allows for scanning integrity to be checked), and a sample indicator (this indicates whether the airline's accounting method is sample or non-sample). FORM-C.DAT is also merged into SALE_PRI.MRG. FORM-C.DAT is a file from the host mainframe that contains information used to decode the form code of the ticket number 12 (the form code is the first three digits of the ticket number 12 and is used to indicate whether the ticket 10 was issued as a passenger ticket, excess baggage ticket, etc.). The check digit method employed is also contained in this file.

The file SER—NO.DAT is also merged into the SALE_PRI.MRG file, and contains the valid serial number ranges issued by the host airline (the serial number is the seven digits after the form code in the ticket number 12). SER—NO.DAT also contains information indicating what type of ticket is issued with each serial number range (passenger ticket, excess baggage ticket, etc.), as well as the check digit method employed. The check digit method given in SER-NO.DAT can modify that given in FORM—C.DAT.

Finally, the file ALC—RES.DAT is referenced after access to the SALE_PRI.MRG file. This file contains an airline code conflict resolution table and a valid airline code table. The valid airline code table lists the airline codes that have been assigned. An airline code that is not on this list is not a valid code and has been read incorrectly. The airline code conflict resolution table is created empirically and contains invalid airline codes and their associated probable correct airline code. For instance, the valid airline code of 220 (indicating LUFTHANSA airlines) is not uncommonly misread by an OCR scanner 20 as 720, 270 or 770, all of which are invalid airline codes. Thus, upon reading an airline code of 720, for instance, the RMS will determine from the valid airline code table that this is an invalid airline code. The RMS will then look up 720 in the airline code conflict resolution table and find that a code of 720 is in reality likely to be an airline code of 220. The RMS will substitute the likely correct airline code into the scanned ticket number 12 before proceeding. In this way, the RMS is able to correct some OCR scanning errors that would otherwise prevent matching of the scanned ticket numbers 12 with the database information.

After all of the above data files have been merged, step 52 then segments the file SALE_PRI.MRG into 100 segments based on the first two high order digits in the ticket numbers. For example, the first segment will contain all ticket numbers beginning with "00", the second segment will contain all ticket numbers beginning with "01", etc. Each segment is further divided into ascending ranges (blocks of contiguous ticket numbers), including single non-contiguous ticket numbers (ranges of one, in which the starting and ending ticket number of the range is the same). These segments and ranges are indicated in a table within the file that lists the starting and ending physical address of each segment and range.

In step 54, the ticket number 12 of the next ticket 10 to be scanned is read by the OCR scanner 20 and transmitted to the RMS running on local computer 22 via line 23. In the RMS application, the local computer may be, for example, a personal computer using, as a minimum, an INTEL 486 processor with a minimum of 32 megabytes of random access memory (RAM) with a cache size of at least 256 kilobytes. The RMS may be implemented in the local computer 24 in the form of a program written in assembly language for realtime processing operations and the language C++ for non-realtime operations. A preferred embodiment implementation of the RMS written in assembly and C++ is illustrated as Appendix A. If, for example, the OCR scanner 20 is scanning tickets 10 at the rate of 1000 per minute, the scanner 20 must send the ticket number 12 to the RMS, the RMS must match the ticket number 12 to the database and send the information required by the scanner 20 to sort the ticket back to the scanner 20, all within 2 milliseconds. This allows the scanner 20 to sort the tickets 10 as it scans them at high speed, thereby obviating the need for the double scanning operation as practised in the prior art.

Once the RMS receives the next ticket number 12 from the scanner 20, it validates the ticket number at step 56. Validation involves comparing the ticket number 12 to the information obtained from the AIRLINE.DAT, FORM—C.DAT and SER—NO.DAT files. If the ticket number 12 is not valid, a reject signal is sent to the scanner 20 at step 58 and the ticket 10 is sorted into a rejection stack 28 at step 60. The process then continues at step 54 with the next ticket 10 to be scanned. If the ticket number 12 is determined to be valid at step 56, however, the process continues at step 62 and the database SALE_PRI.MRG is searched in an attempt to match the ticket number 12. A cascaded binary search is used on the database. The segment table of the file is consulted to obtain the beginning and ending addresses of the segment that the ticket number 12 falls within (based upon its first two digits). If the appropriate range is empty (i.e. no ticket numbers in database within that range) then the table indicates this and the search is terminated as a "no match found." On the other hand, if there are ticket number listings in the appropriate segment, the RMS subtracts the beginning segment address from the ending segment address to find the middle of the segment. The ticket number stored at this location is compared to the scanned ticket number 12. If there is no match and the scanned ticket number 12 is, for instance, higher than the ticket number in the data base, then the current address is subtracted from the ending segment address. The scanned ticket number 12 is then compared to the ticket number stored at this new address. Conversely, if the scanned ticket number 12 had been less than the first compared ticket number in the database, the new comparison address would have been computed by subtracting the beginning segment address from the comparison address. By iterating this process, the possible range of addresses where the matching ticket number in the database might be located is continually halved until it is determined that there is either a match or no match at step 64.

If a match is found at step 64 (i.e. the host airline has sales data for the scanned ticket number 12), then the RMS sends the ticket number 12 back to the scanner 20 at step 66 along with other information associated with the ticket 10 that the RMS gathered from the files merged into the SALE_PRI.MRG file. The scanner 20 uses this extra information (information that is not contained on the face of the ticket) in order to decide which stack 28 to sort the ticket 10 into at step 68. The process then continues at step 54 where the next ticket 10 is scanned by OCR scanner 20.

If no match is found at step 64, the RMS checks at step 70 whether this is the first coupon received for ticket number 12. The RMS does this by looking for the ticket number 12 in a database file SALE_FCR.SGL. This file is generated by the RMS and contains ticket numbers that are valid but are not found in the SALE_PRI.MRG database. If the valid ticket number 12 is not in the SALE_FCR.SGL file, then this indicates that the presently scanned ticket 10 is the first coupon received for that ticket. Therefore, the RMS adds the ticket number 12 to the SALE_FCR.SGL file at step 72 and indicates to the scanner 20 at step 74 that the currently scanned ticket 20 should be sorted into a stack 28 designated for manual keying or imaging at step 76. During a later manual keying procedure, a human operator will key in the sales data from the face of the ticket 10 so that the host will have sales data for that ticket number 12. When the host is notified that a match has been found for this ticket number 12, it is told that the match was a first coupon received match, so that the host will know to hold the ticket in suspense until the manually keyed in data from the face of the ticket 10 is later transmitted back to the host. The ticket number 12 is added to the SALE_FCR.SGL file at step 72 so that if another coupon is received later bearing that ticket number 12, the RMS will know that the host has sales data for that ticket number 12 and it will be treated as a matched ticket number. After step 76, the RMS returns to step 54 and scans the next ticket 10.

If, at step 70, the unmatched ticket is found in the SALE_FCR.SGL file, then the RMS knows that the first coupon for this ticket 10 has previously been received and sorted out for manual keying, so the present ticket 10 can be handled like any other matching ticket. Therefore, the ticket number and associated information required for the sort decision is sent back to the OCR scanner 20 at step 78 and the scanner 20 sorts the ticket 10 into the appropriate stack 28 at step 80. The process then continues at step 54 where the next ticket 10 is scanned.

Figure 4:
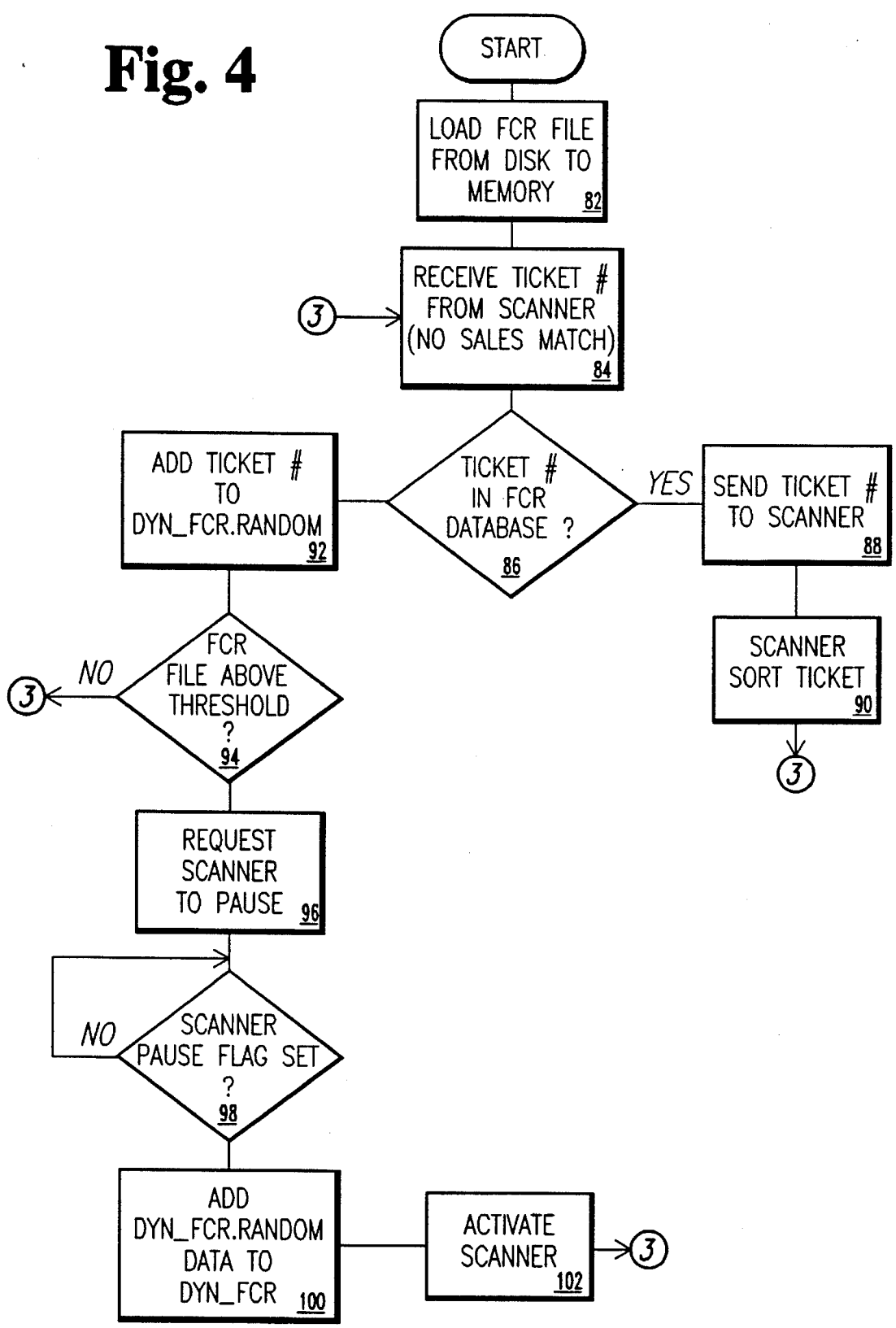
FIG. 4 is a process flow diagram of the first coupon received portion of the real time matching system of the present invention.

In order to maintain the requisite system speed of the RMS, the first coupon received file search may be implemented in the novel arrangement illustrated in FIG. 4. As described above, the database searching for a ticket number match is performed using a cascaded binary search. This type of search may be performed faster than a sequential file search because it takes advantage of the fact that a range of ticket numbers is being searched. The SALE_FCR.SGL is copied from the computer 22's disk storage and contains first coupon received ticket numbers. The SALE_FCR.SGL file is arranged into ranges as described hereinabove with respect to SALE_PRI.MRG. This file may be searched using the cascaded binary search method whenever a valid ticket number 12 is not found in the SALE_PRI.MRG file. However, if the RMS finds a valid ticket number that is not in either the SALE_PRI.MRG or SALE_FCR.SGL files, it must add the new ticket number 12 to the SALE_FCR.SGL file. However, the RMS does not have time to do this while the scanner 20 is operating at full speed, so the new FCR ticket number 12 is added to a temporary file DYN_FCR.RANDOM in memory. This file is periodically sorted into ascending order by the RMS and stored as a third FCR file, DYN_FCR. Therefore, until the scanner 20 halts and the new FCR ticket numbers 12 can be updated into the SALE_FCR.SGL file, there exist two FCR files that must be searched for each valid ticket number 12 that does not match the SALE_PRI.MRG file. The process is illustrated in FIG. 4 as follows.

At step 82, the SALE_FCR.SGL file is loaded from disk into RAM memory. At step 84, a valid ticket number 12 is received from the scanner 20 and is not matched in the SALE_PRI.MRG file. Step 86 looks for the ticket number 12 in the SALE_FCR.SGL, DYN_FCR and DYN_FCR.RANDOM files. If a match is made in any of the files, a previous coupon from the currently scanned ticket 10 was received and the sales data will be manually keyed off of that first coupon, therefore, the scanner 20 is directed at step 88 to sort the ticket 10, which the scanner 20 does at step 90.

However, if neither the SALE_FCR.SGL, DYN_FCR or the DYN_FCR.RANDOM files contain a match for the currently scanned ticket number 12, the ticket number 12 is added to DYN_FCR.RANDOM at step 92. At step 94, the file size of DYN_FCR.RANDOM is checked to see if it is above a predetermined threshold size. The threshold size is the file size where the time required to do a sequential sort through the file is approaching the amount of time available to accomplish the search while maintaining full scanning rates at scanner 20. If this threshold file size has not yet been reached, then the RMS can wait before it sorts the DYN_FCR.RANDOM file into the sorted DYN_FCR file, and the process returns to step 84, awaiting another unmatched valid ticket number 12.

If step 94 determines that DYN_FCR.RANDOM is above the threshold file size, a hardware flag is set at step 96 which will indicate to the scanner 20 that the RMS needs for it to pause while DYN_FCR.RANDOM is sorted into DYN_FCR. Step 98 checks to see if the scanner has been able to pause in response to the flag. If not, the RMS waits for such a pause. When the scanner 20 pauses, the RMS sorts DYN_FCR.RANDOM into DYN_FCR at step 100. Step 102 then reactivates the scanner 20 and the process continues at step 84, awaiting another unmatched valid ticket number 12.

More complete file descriptions and file format arrangements are given for each file in Appendix B.

From the process illustrated in FIGS. 3 and 4, it will be appreciated by those skilled in the art that the RMS allows the individual airline tickets 10 to be sorted in real time by use of information that is not found on the face of the ticket 10 itself. By arranging and cross-referencing the available information into the novel file arrangement of the present invention, as well as by providing the novel airline code conflict resolution table of the present invention, it is possible to maintain the very high scanning speeds of the prior art while performing the matching procedure fast enough to allow the scanner 20 to sort the tickets 10 as they are being scanned.

Figure 5:
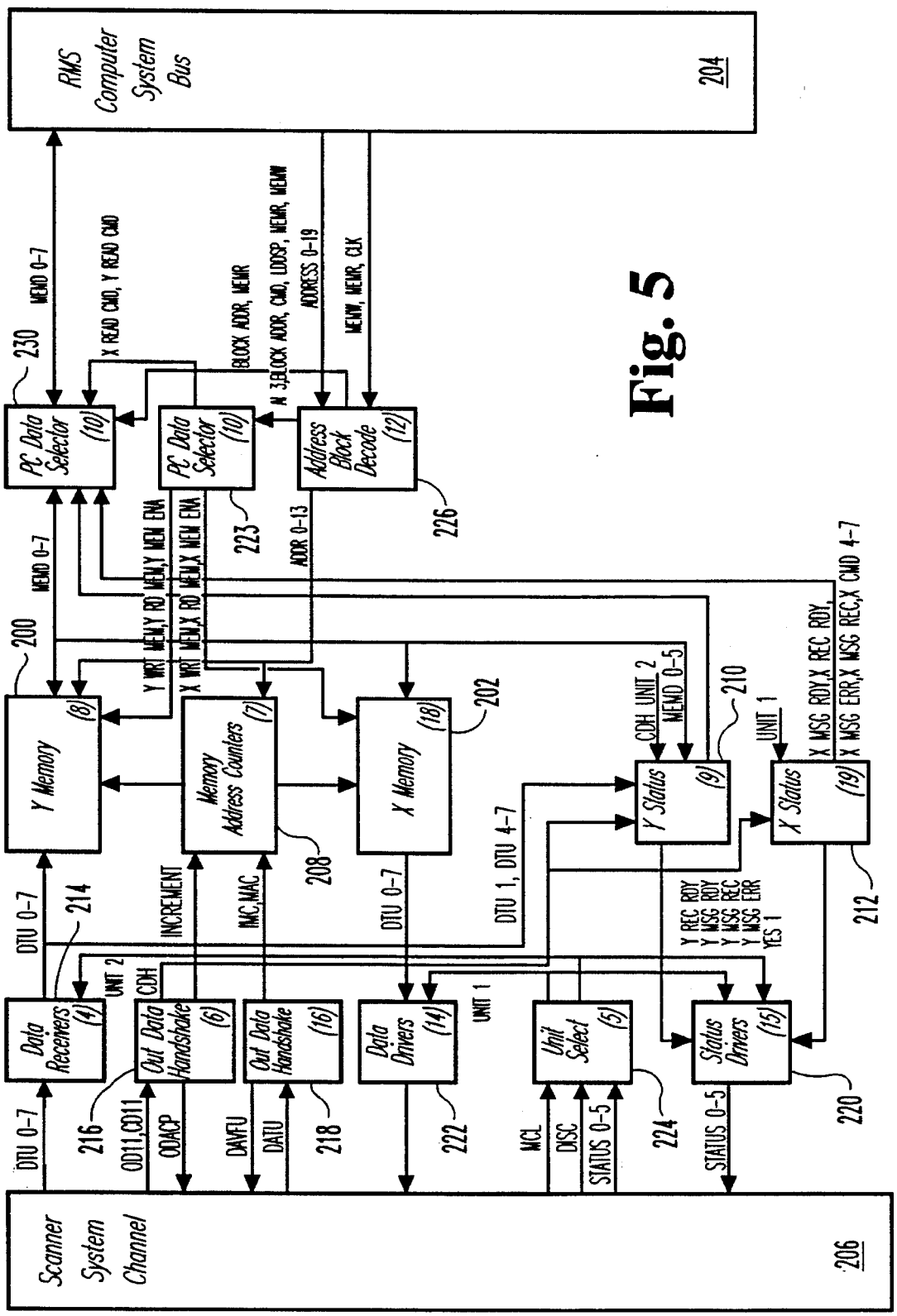
FIG. 5 is a schematic block diagram of the two-way communications device of the present invention.

In order to provide communication between the local computer 22 running the RMS and the scanner 20 that is fast enough to maintain the scanning speeds required by the industry, a novel two-way communications link is provided as shown in FIG. 5. The communications link allows each device to communicate with the other without interruption of the process being executed by either device.

Figure 13:
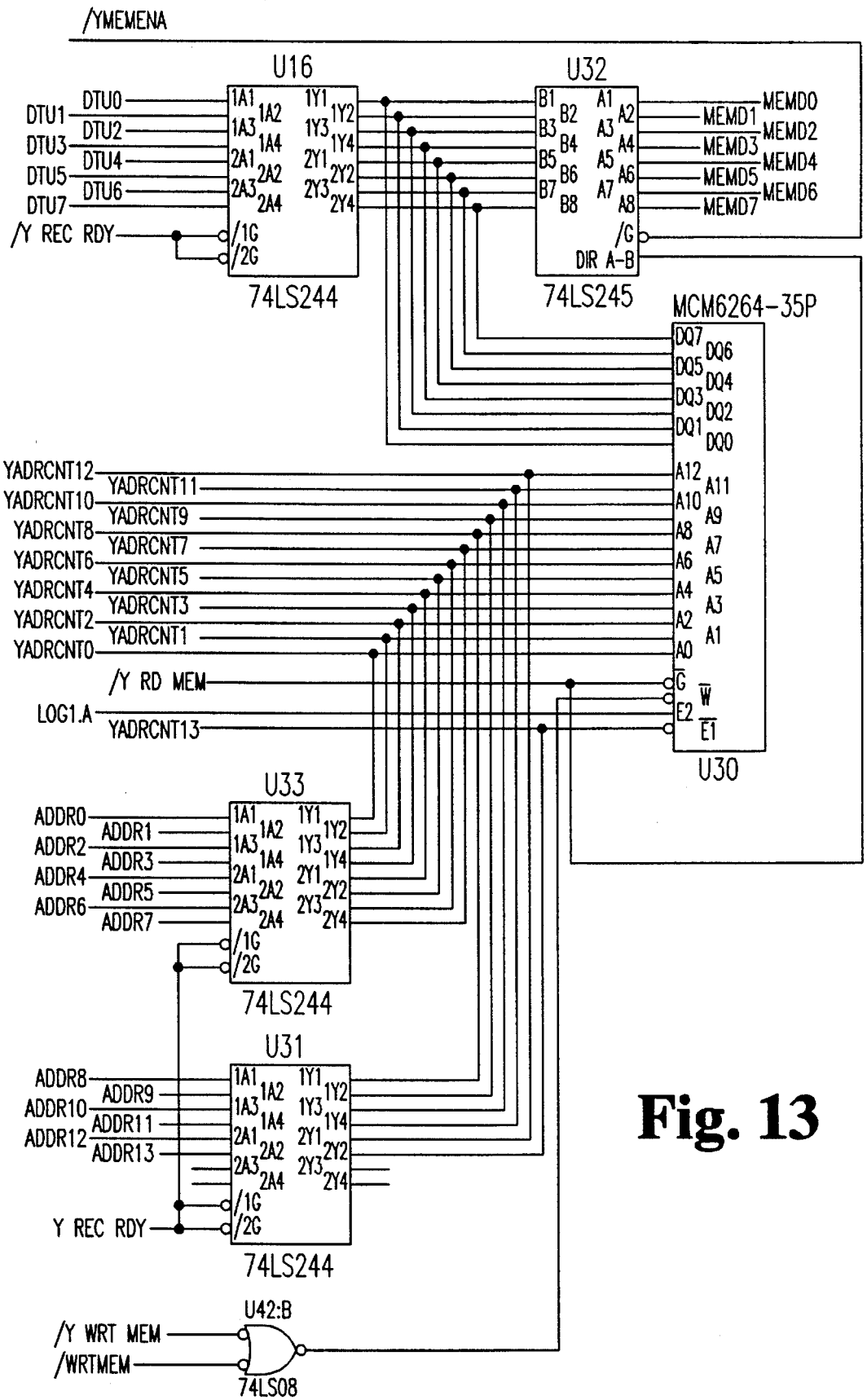
FIG. 13 is a schematic circuit diagram of a preferred embodiment of the "Y" memory of the present invention.
Figure 14:
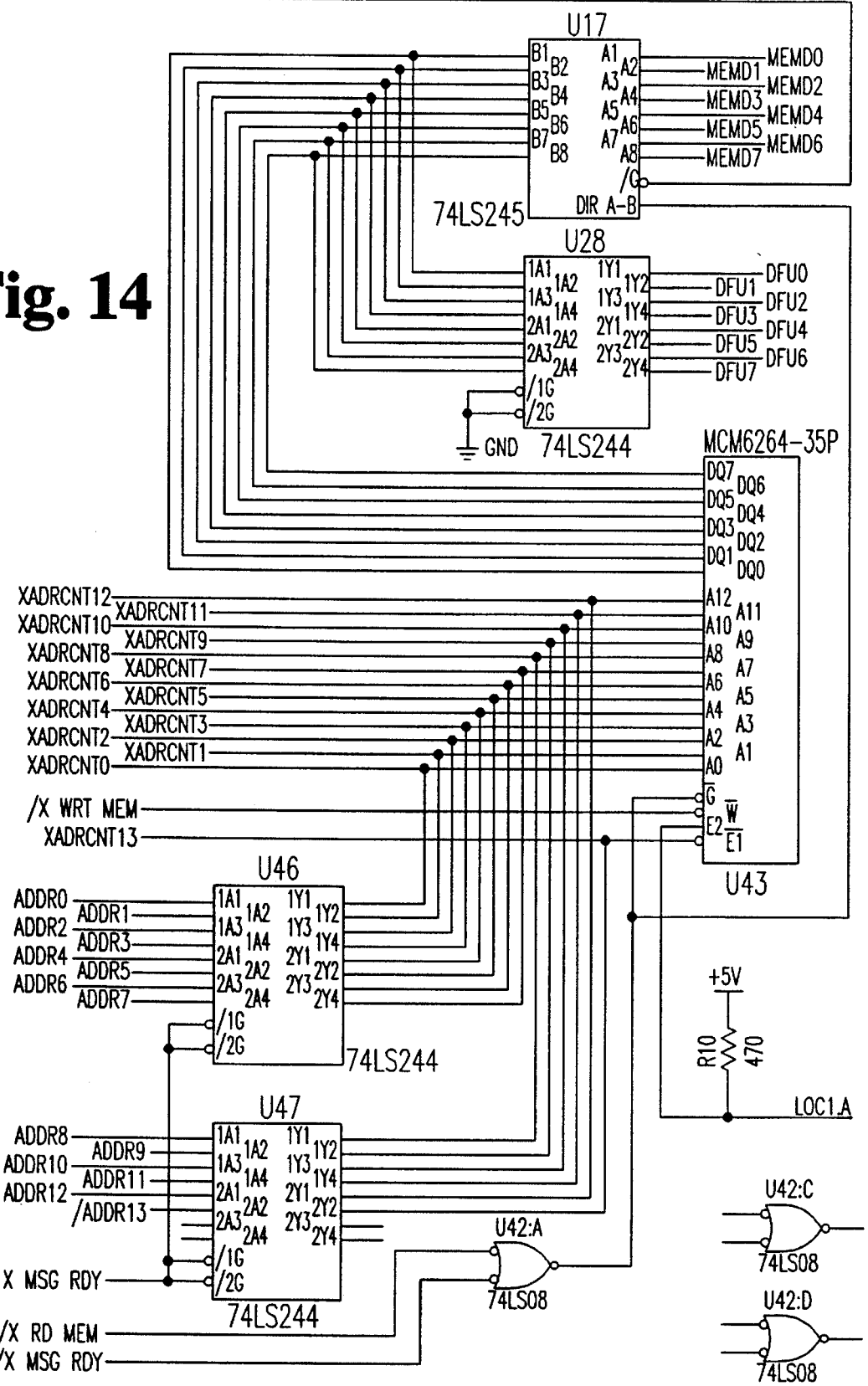
FIG. 14 is a schematic circuit diagram of a preferred embodiment of the "X" memory of the present invention.

As shown in FIG. 5, two 8 kilobyte blocks of memory 200, 202 are provided for communication between the RMS computer system bus 204 and the scanner computer system channel 206. Memory 200 is also designated as the "Y" memory and memory 202 is also designated as the "X" memory for convenience of description. FIG. 13 illustrates a preferred embodiment schematic circuit diagram of the memory 200. FIG. 14 illustrates a preferred embodiment schematic circuit diagram of the memory 202. The computer coupled to the scanner system channel 206 is preferably a Harris model 6024/5, 6024/6 or H700. Memory 200, 202 may each be a Fujitsu MB8464-80, for example. The memory block 200 is an output for the scanner channel 206 that is written to using output I/O instructions, and an input for the RMS bus 204 that is read directly as addressable memory. The memory block 202 is an input for the scanner channel 206 that is read from using input I/O instructions, and an output for the RMS bus 204 that is read directly as addressable memory. Each of the memories 200, 202 have an associated memory address counter 208, which may be, for example, a Texas Instruments 74LS590. FIG. 12 illustrates a preferred embodiment schematic circuit diagram of the memory address counter 208.

Figure 15:
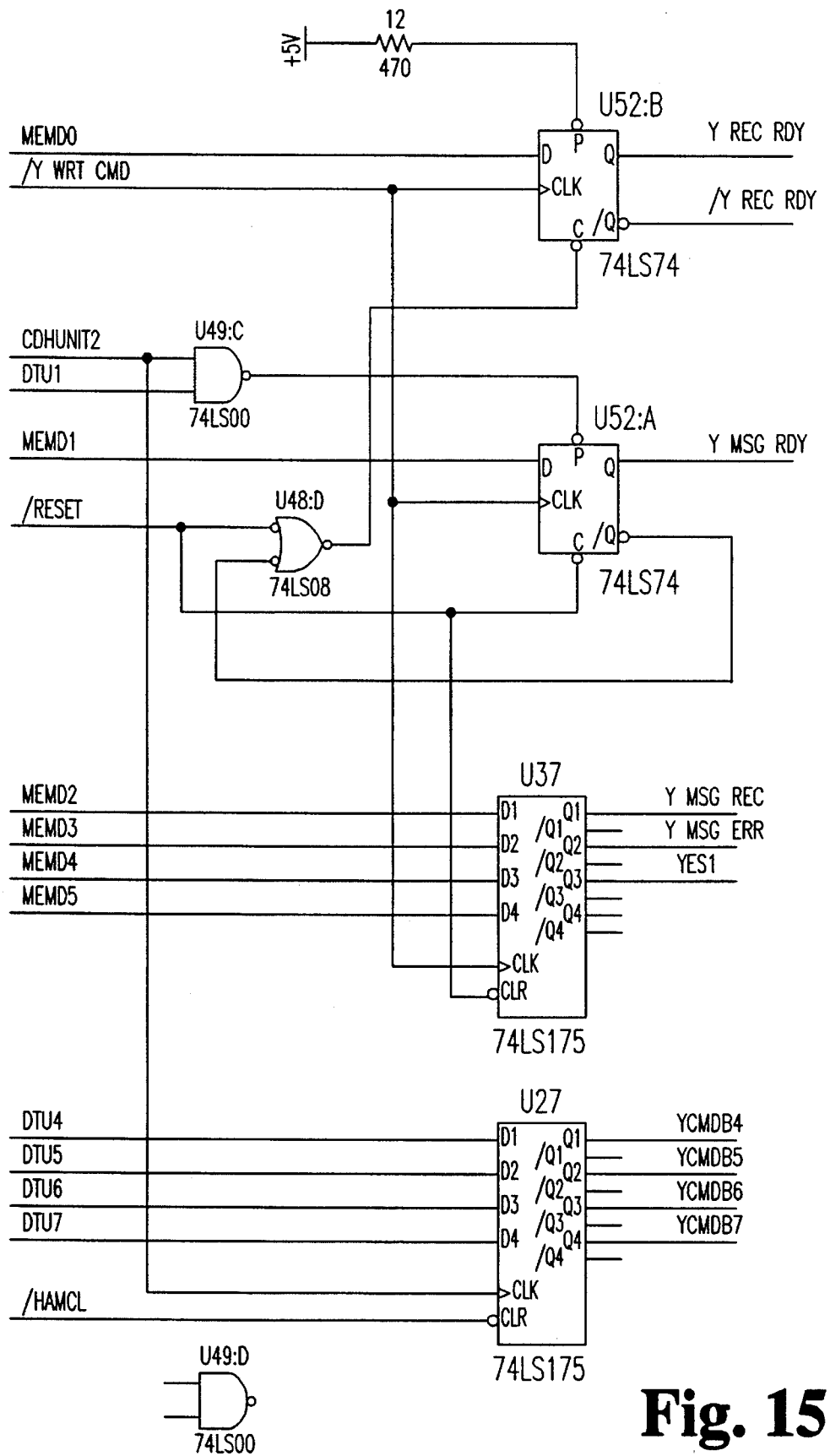
FIG. 15 is a schematic circuit diagram of a preferred embodiment of the "Y" status register of the present invention.

A status register 210 is provided which stores 5 status bits that are used to indicate communication status and program handshake associated with memory block 200 (Y memory). The assignment of each bit is as follows:

BIT 0=Y RECEIVE READY (RMS ready to receive data)
BIT 1=Y MESSAGE READY (data from scanner stored)
BIT 2=Y MESSAGE RECEIVED (data from scanner received)
BIT 3=Y MESSAGE ERROR (data from scanner contained an error)
BIT 4=Y FUTURE EXPANSION (not currently used)
FIG. 15 illustrates a preferred embodiment schematic circuit diagram of the status register 210.

Figure 16:
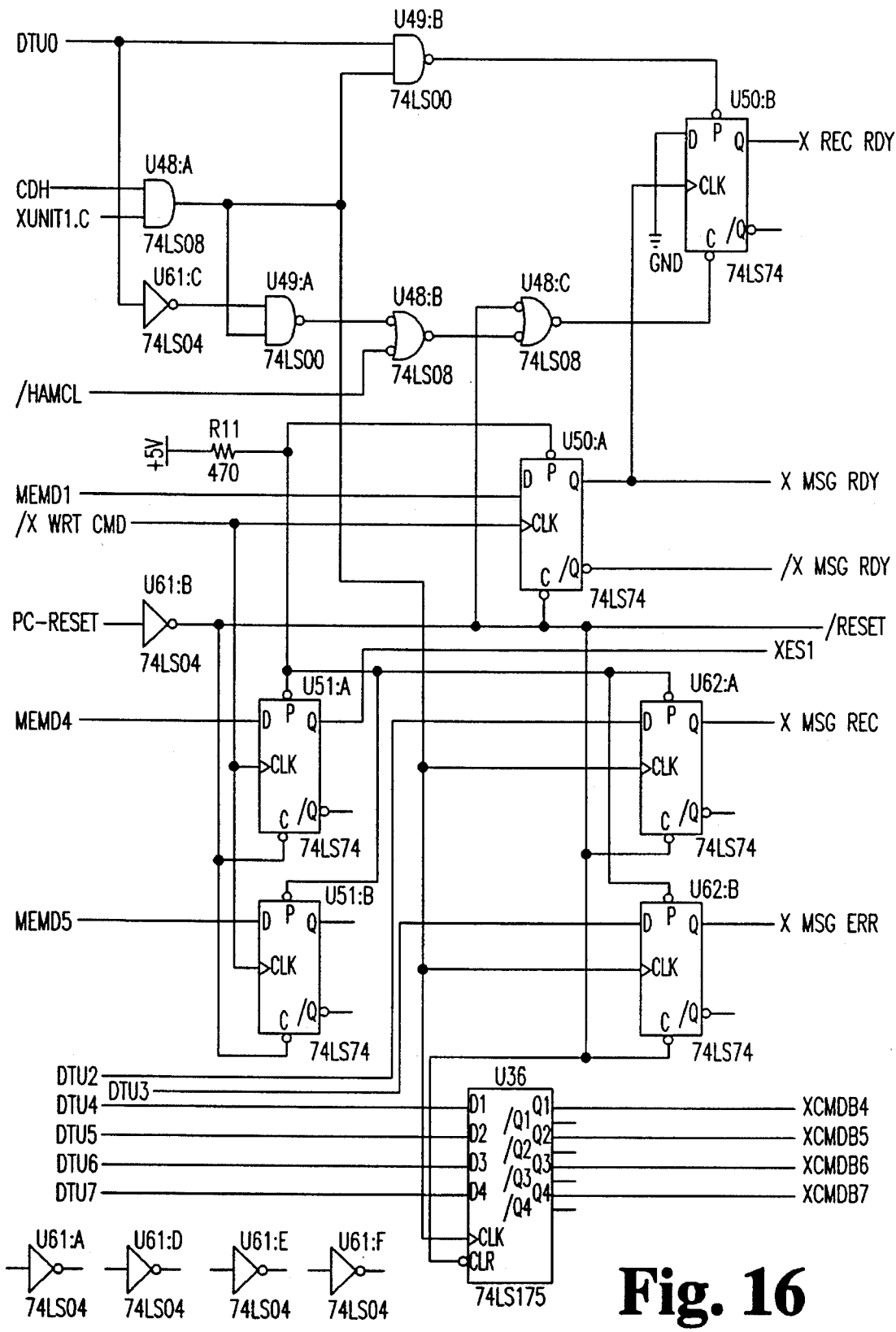
FIG. 16 is a schematic circuit diagram of a preferred embodiment of the "X" status register of the present invention.

A status register 212 is provided which stores 5 status bits that are used to indicate communication status and program handshake associated with memory block 202 (X memory). The assignment of each bit is as follows:

BIT 0=X RECEIVE READY (scanner ready to receive data)
BIT 1=X MESSAGE READY (data from RMS stored)
BIT 2=X MESSAGE RECEIVED (data from RMS received)
BIT 3=X MESSAGE ERROR (data from RMS contained an error)
BIT 4 32 X FUTURE EXPANSION (not currently used)
FIG. 16 illustrates a preferred embodiment schematic circuit diagram of the status register 212.

Figure 6:
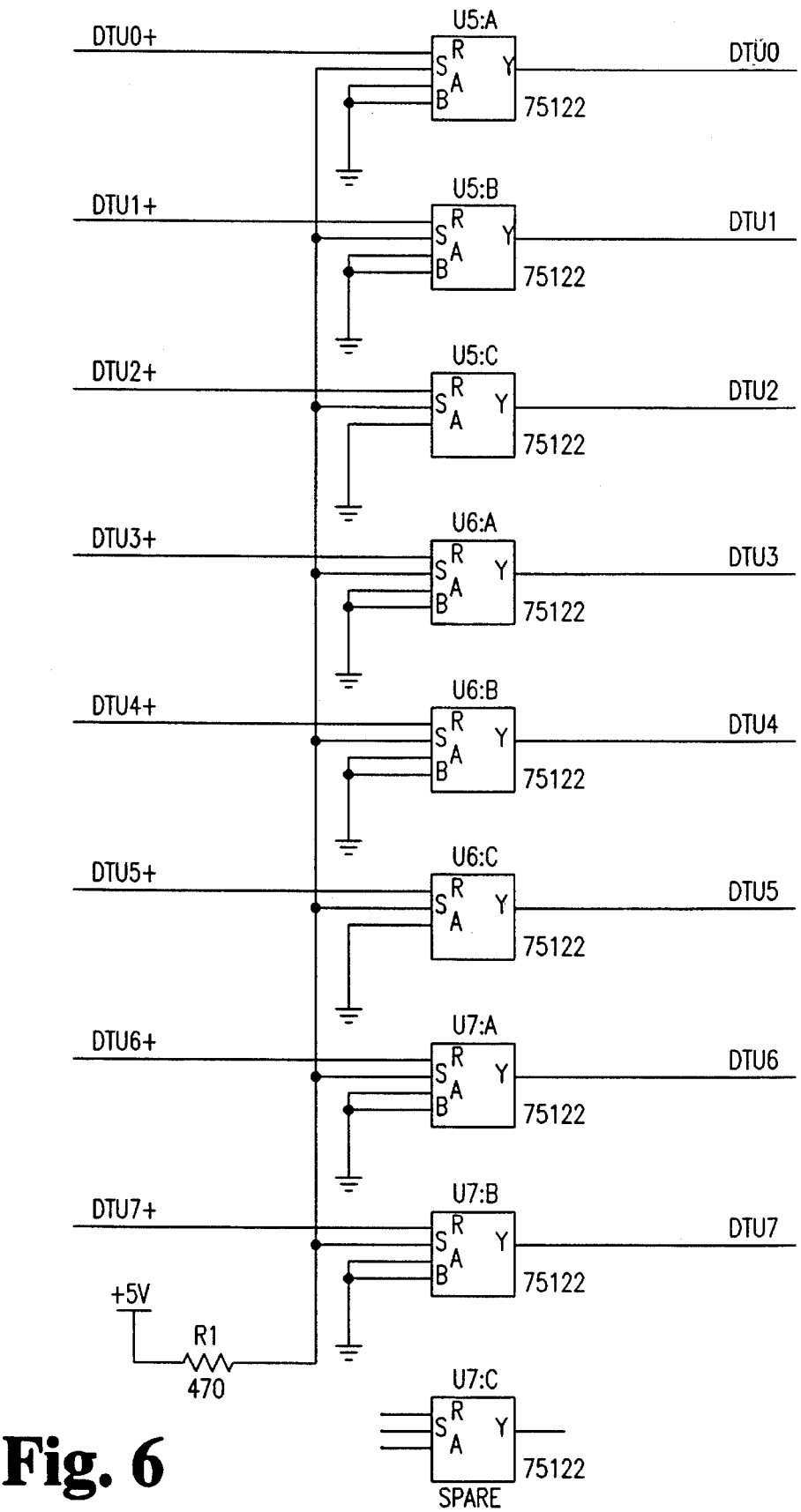
FIG. 6 is a schematic circuit diagram of a preferred embodiment of the data receiver of the present invention.
Figure 7:
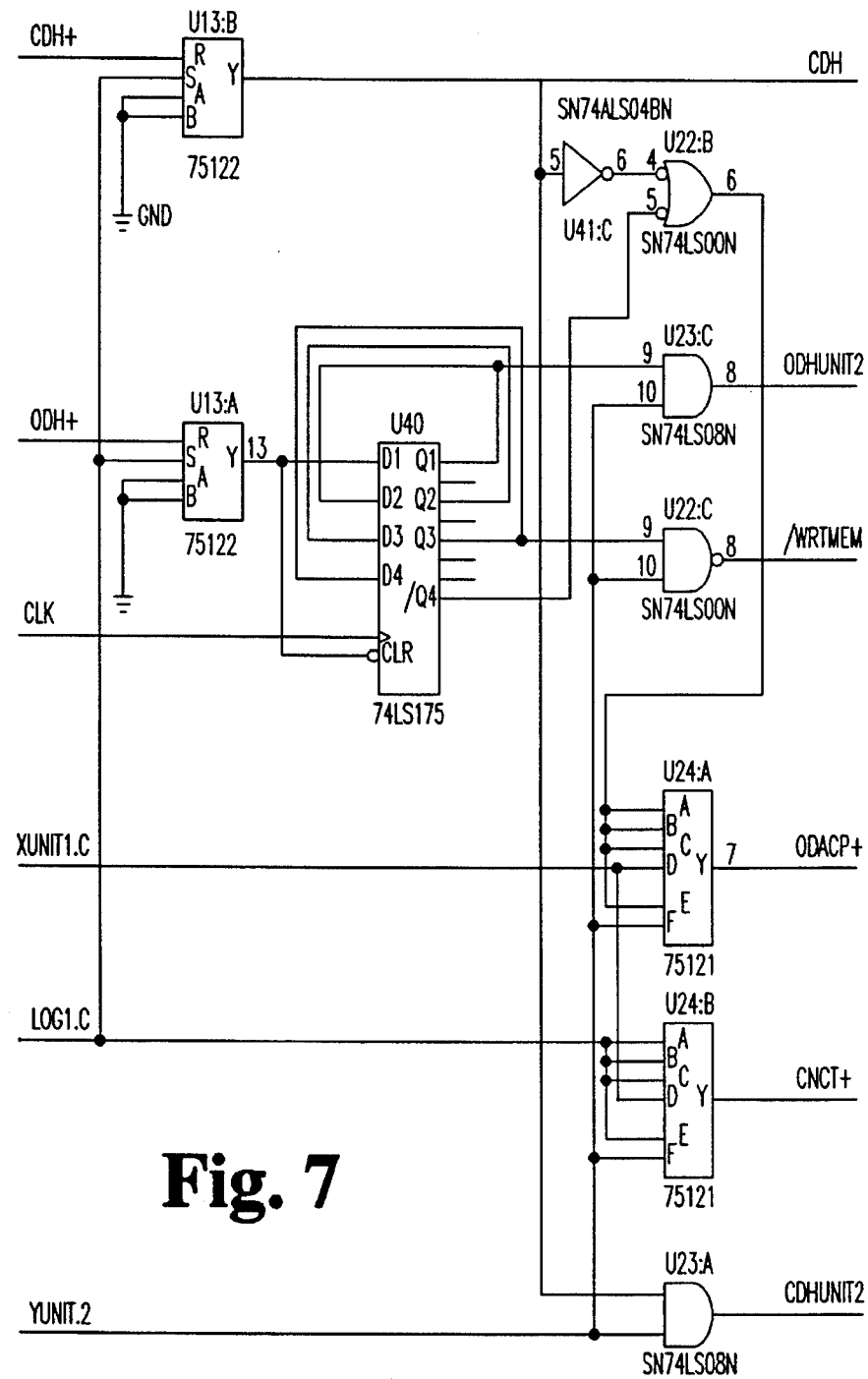
FIG. 7 is a schematic circuit diagram of a preferred embodiment of a first output data handshake logic of the present invention.
Figure 7:
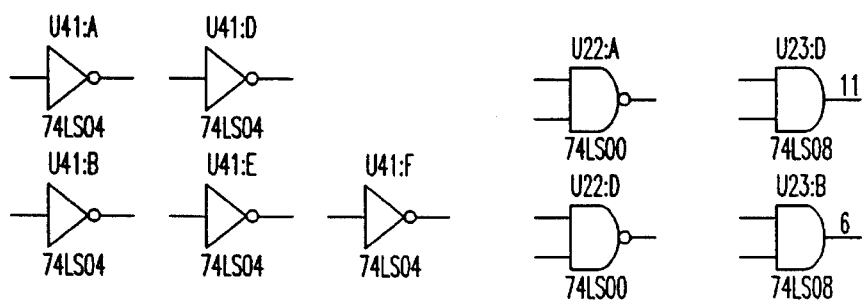
Figure 8:
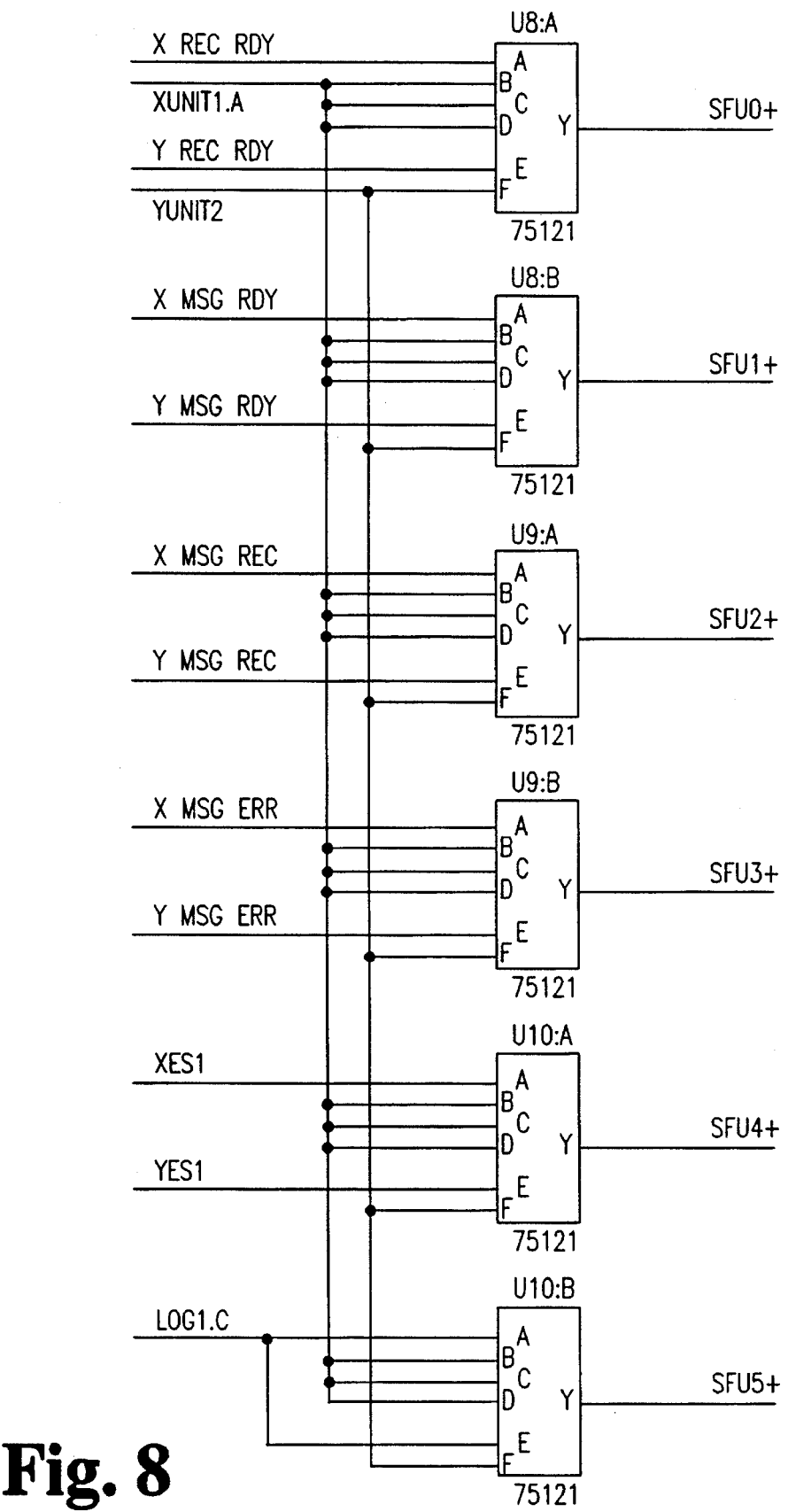
FIG. 8 is a schematic circuit diagram of a preferred embodiment of the driver circuitry of the present invention.
Figure 9:
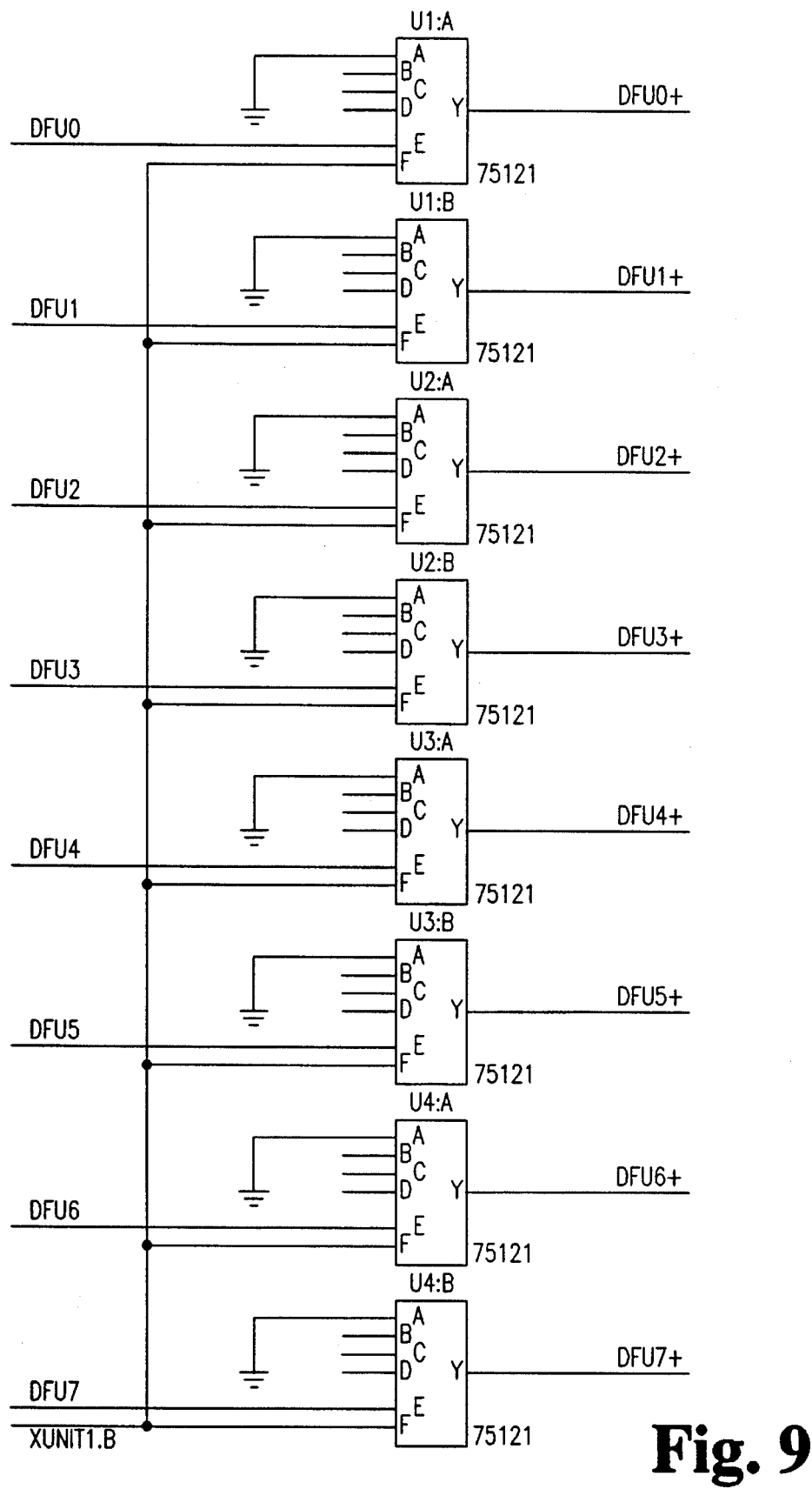
FIG. 9 is a schematic circuit diagram of a preferred embodiment of the data latch of the present invention.
Figure 10:
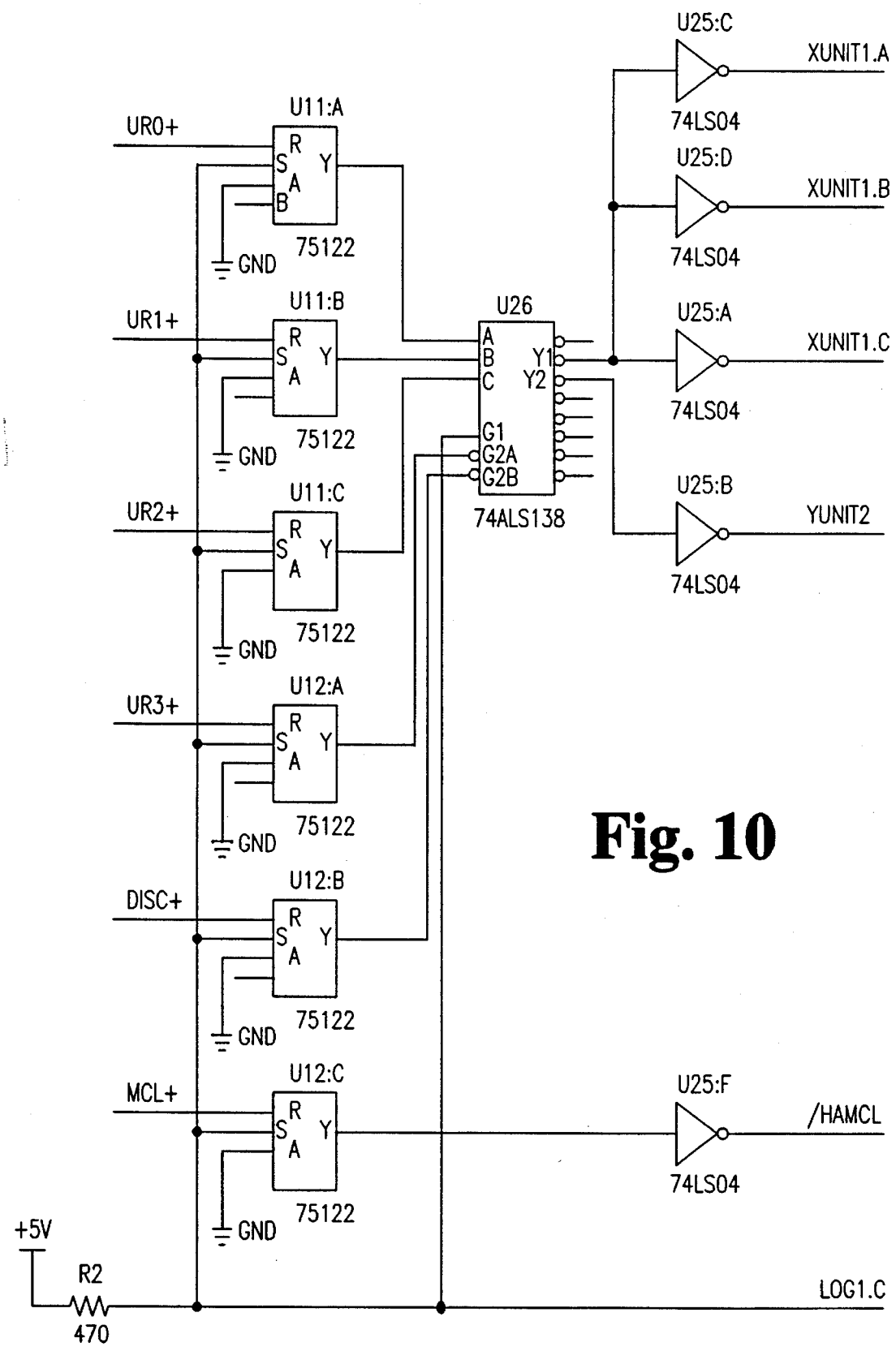
FIG. 10 is a schematic circuit diagram of a preferred embodiment of the unit selector of the present invention.
Figure 19:
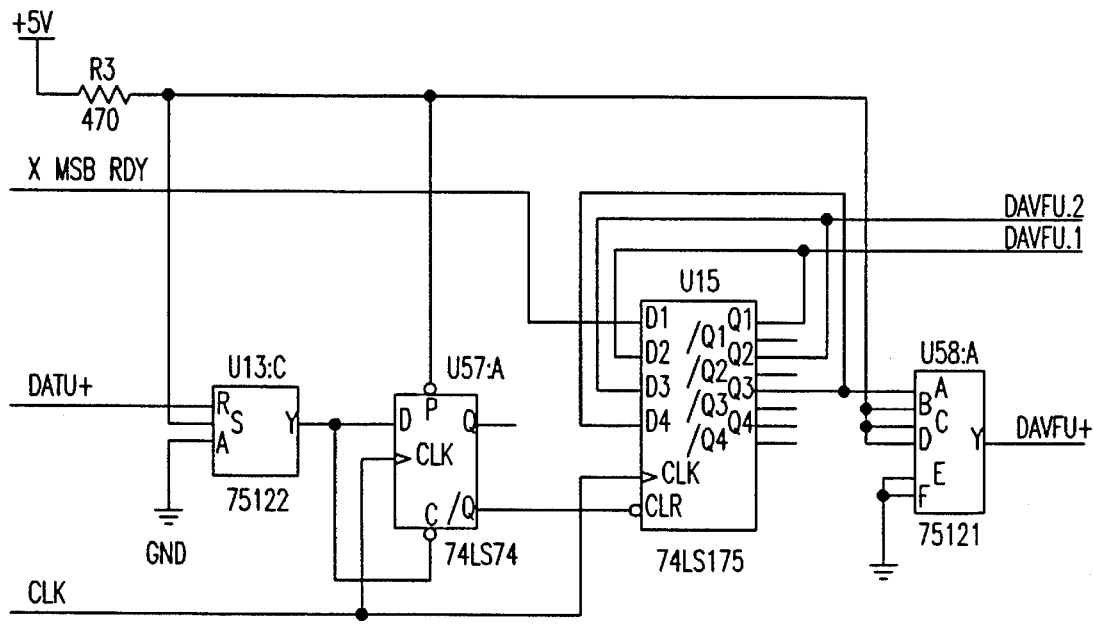
FIG. 19 is a schematic circuit diagram of a preferred embodiment of the second output data handshake logic of the present invention.
Figure 19:
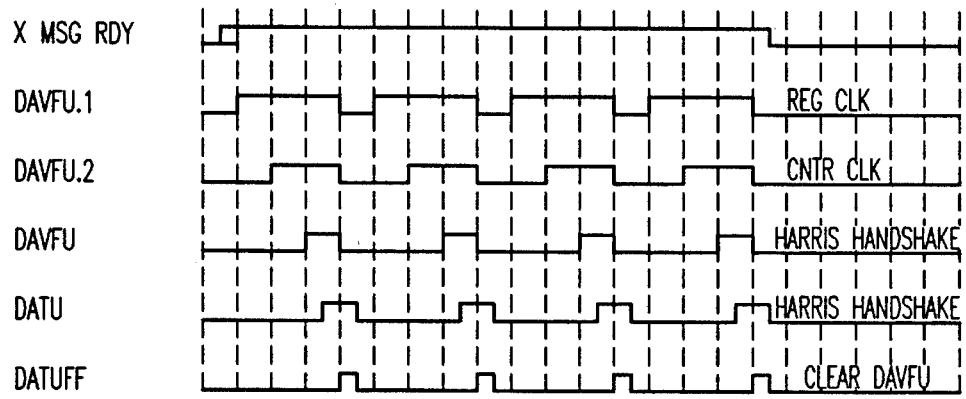
Figure 19:
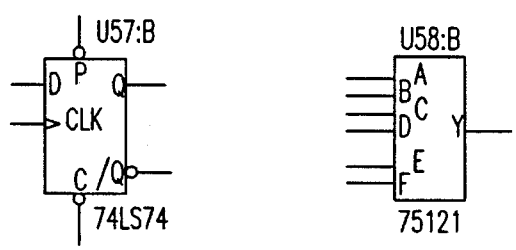

The scanner system channel 206 outputs data to memory 200 through 8 bit data receivers 214, such as Texas Instruments TI75122. Some bits of data receiver 214 are also latched into status registers 210, 212. FIG. 6 illustrates a schematic circuit diagram of a preferred embodiment of the data receiver 214. Output data handshaking for communication with scanner system channel 206 is handled by output data handshake logic 216, 218. This logic must be designed to meet the requirements of the scanner system channel in use. FIG. 7 illustrates a preferred embodiment schematic circuit diagram of the output data handshake logic 216 for use with the Harris computers listed above. FIG. 19 illustrates a preferred embodiment schematic circuit diagram of the output data handshake logic 218 for use with the Harris computers listed above. Status registers 210 and 212 are read into scanner system channel 206 through driver circuitry 220, which may be a Texas Instruments TI75121, for example. FIG. 8 illustrates a preferred embodiment schematic circuit diagram of the driver circuitry 220. The scanner system channel 206 inputs data from memory 202 through 8 bit data latch 222, such as Texas Instruments TI75121, for example. FIG. 9 illustrates a preferred embodiment schematic circuit diagram of the data latch 222. Unit Selector 224 performs the connect sequence to the scanner system channel 206 and selects the proper status register and memory for the scanner channel 206 I/O instructions. FIG. 10 illustrates a preferred embodiment schematic circuit diagram of the unit selector 224.

Figure 11:
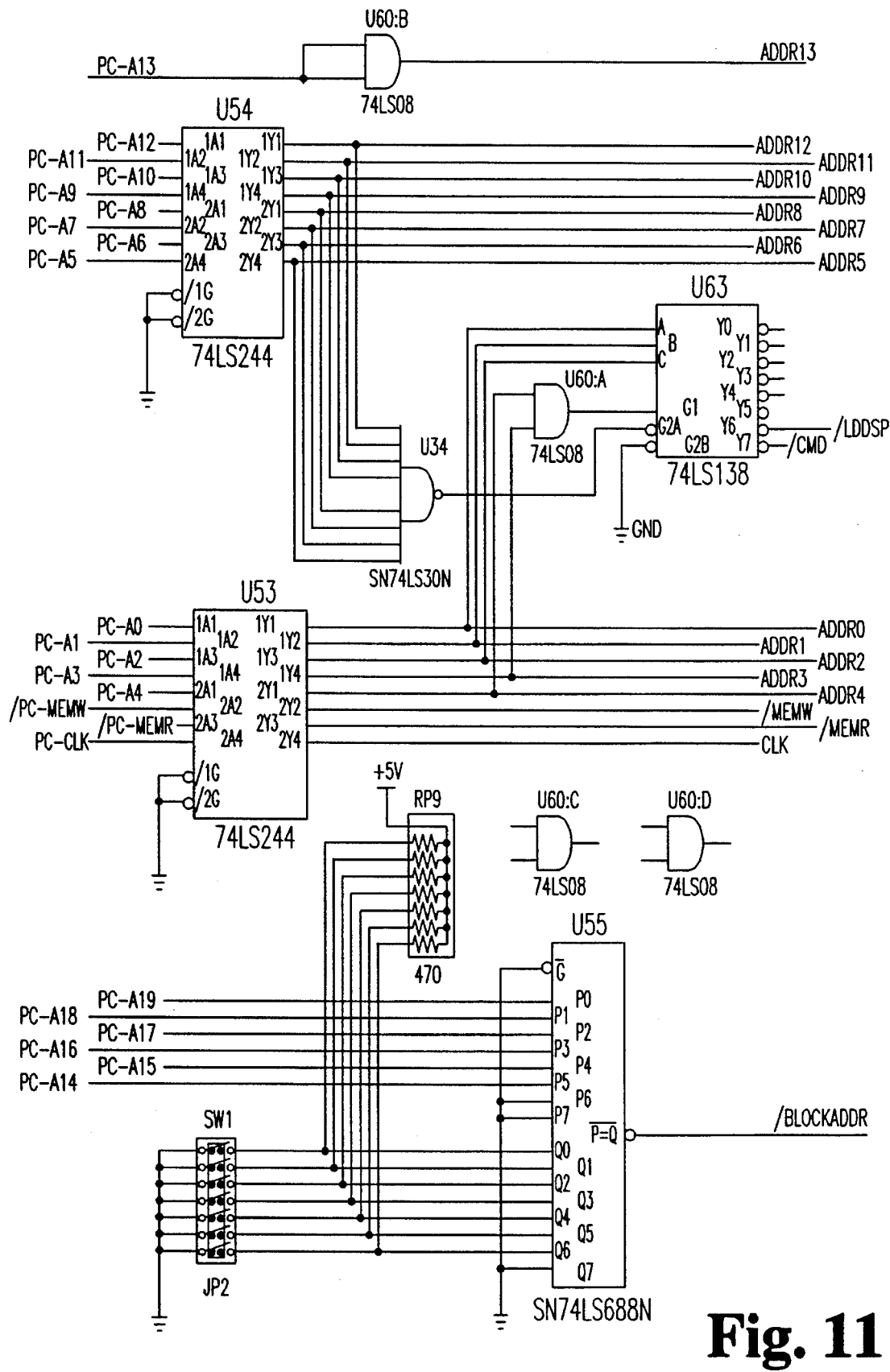
FIG. 11 is a schematic circuit diagram of a preferred embodiment of the address decoder of the present invention.
Figure 17:
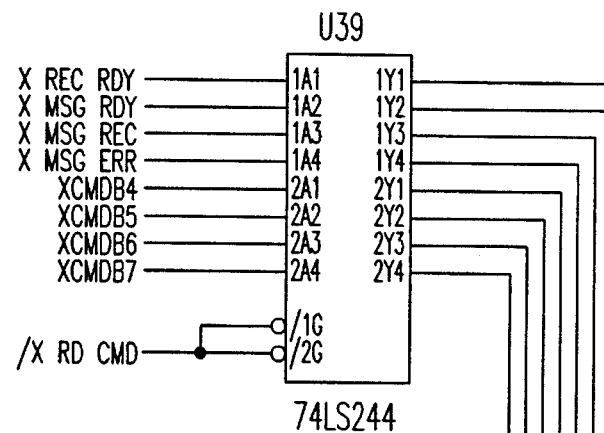
FIG. 17 is a schematic circuit diagram of a preferred embodiment of the multiplexer of the present invention.
Figure 17:
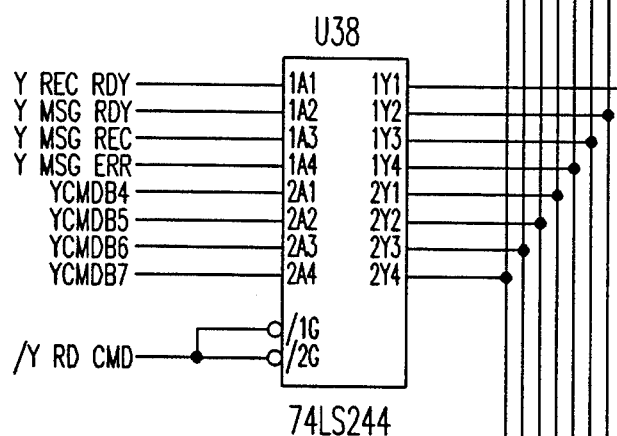
Figure 17:
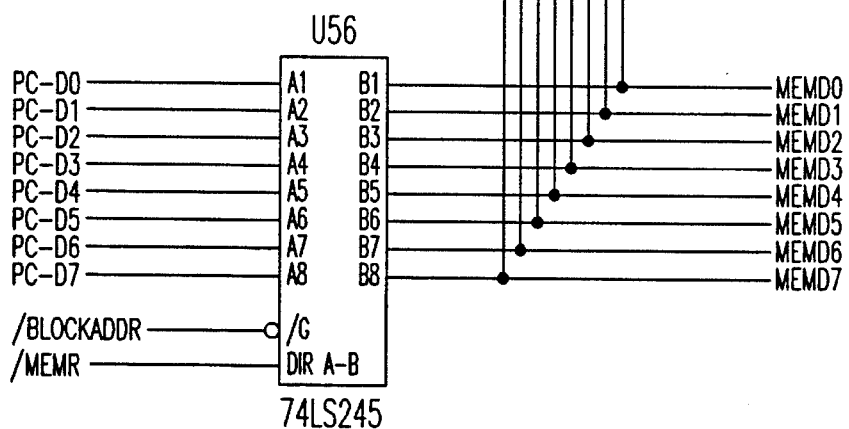
Figure 18:
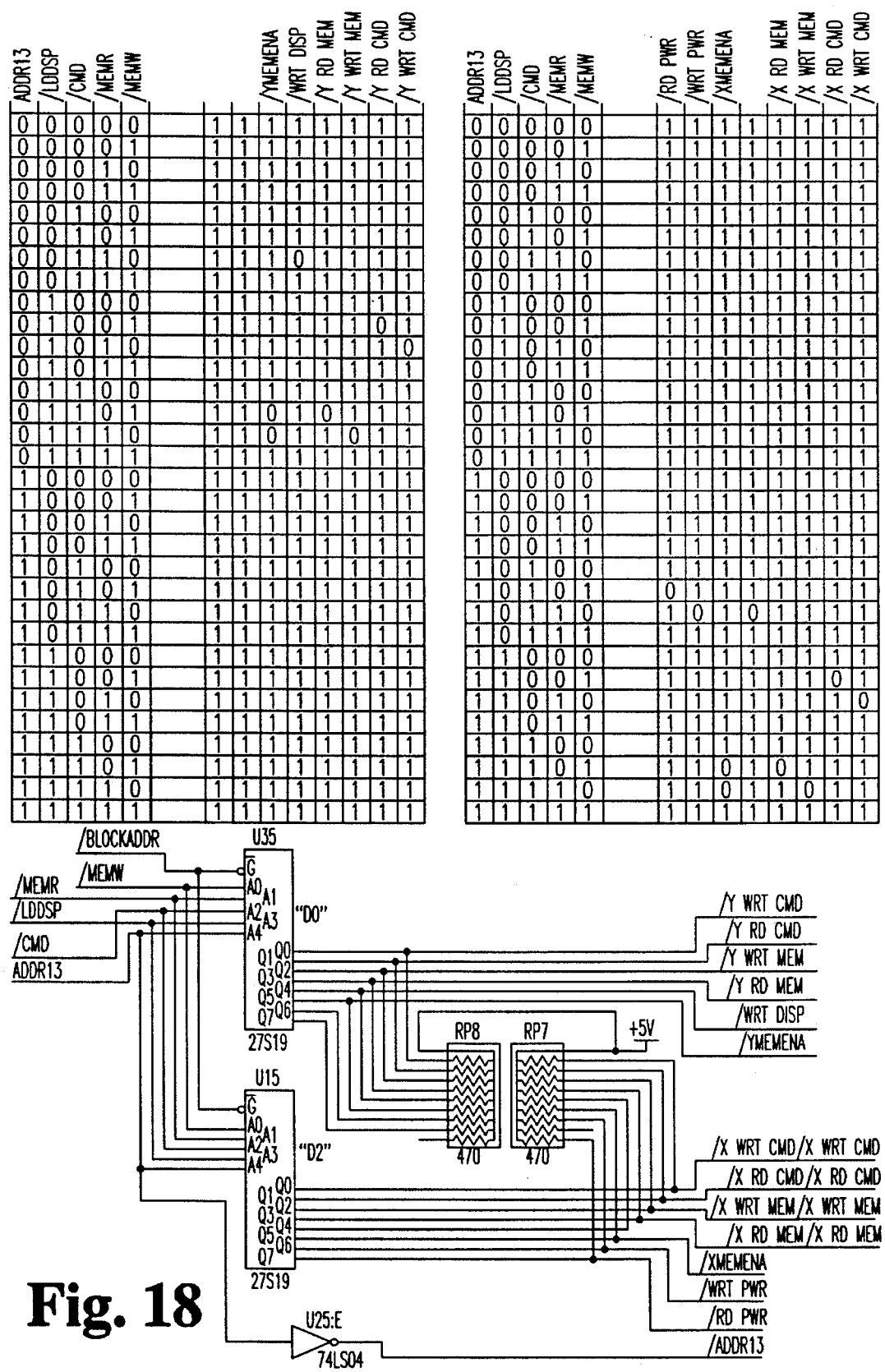
FIG. 18 is a schematic circuit diagram of a preferred embodiment of the memory controller of the present invention.

Associated with the RMS system bus is the address decoder 226. The address decoder 226 decodes the 20-bit address information sent by RMS bus 204 in order to determine if one of the memories 200, 202 are being addressed. If so, the address is sent on to the memories 200, 202 and to memory controller 228 which, depending upon the exact address, selects which memory 200, 202 or status registers 210, 212. FIG. 11 illustrates a preferred embodiment schematic circuit diagram of the address decoder 226. FIG. 18 illustrates a preferred embodiment schematic circuit diagram of the memory controller 228. Finally, PC data selector 230 selects the input source for RMS system bus 204 as either memory 200, status register 210 or status register 212. FIG. 17 illustrates a preferred embodiment schematic circuit diagram of the multiplexer 230.

The last address of each memory block 200, 202 is used by the RMS system bus 204 to send status to the scanner system channel 206 or to receive status from the scanner system channel 206. The status bits in the status byte are supplied to the status registers 210, 212.

The status bit Y RECEIVE READY allows the scanner system system channel 206 to control the address for the RMS system bus 204 input block. As each output instruction from the scanner system channel 206 is issued (using an OUTPUT DATA WORD instruction), the output byte is stored into the RMS system bus 204 input block (memory 200) beginning at location zero. The address is automatically incremented by memory address counter 208 for the next output byte. When all bytes have been output by the scanner system bus, the status bit Y MESSAGE READY is set by the scanner system channel 206 using an OUTPUT COMMAND WORD instruction. The RMS system bus can at its convenience check the status byte in memory 200 to see if data has been placed into the memory by the scanner system channel 206. When it finds that there is data in the memory 200, it resets the Y RECEIVE READY status bit, and reads the data from memory 200. Afterwards, the scanner system channel 206 is signaled that the data has been received by the RMS system bus when the RMS system bus sets the Y MESSAGE RECEIVED status bit. The data transferred will always include a record count, message type, byte count and checksum according to a predefined protocol. If any of these are invalid when compared to the received data, then the RMS system bus will set Y MESSAGE ERROR.

The status bit X RECEIVE READY is set by the scanner system channel 206 when the scanner computer is initialized. When the RMS system bus 204 needs to send data to the scanner system channel 206, it will check the status of X RECEIVE READY, then store the data into memory 202. After the data is stored, the RMS system bus 204 will set the status bit X MESSAGE READY. This status bit redirects the memory's address control for the memory 202. When the scanner system channel 206 sees this status bit set, it will reset the X RECEIVE READY status bit and, at its convenience, input the data (using INPUT DATA WORD instructions). The first byte of data is read from location zero and then the address is incremented by memory address counter 208. This process continues until all of the data is read into the scanner system channel 206 memory (not shown). The data is checked for errors and, if correct, the X MESSAGE RECEIVED status bit is set by issuing an OUTPUT COMMAND WORD instruction with the appropriate bit. Again, the record count, message type, byte count and checksum is used to validate the data and if it is found to be invalid, then the X MESSAGE ERROR status bit is also set.

It will be appreciated by those skilled in the art that the communications link of FIG. 5 allows for rapid two-way communication of blocks of data between any two devices without interruption of the processes being performed by either device.

It will be further appreciated by those skilled in the art that neither the hardware nor the software embodiments illustrated herein and defined by the appended claims need be limited to the airline ticket applications disclosed. Either or both embodiments may be used to advantage in any field where similar problems must be solved. Consequently, the present invention comprehends various substitutions, modifications and alterations to the disclosed embodiments as would fall within the scope of the appended claims.

What is claimed is:

1. A method for scanning and sorting documents, comprising the steps of:

(a) reading first data from a document by optical character recognition;

(b) accessing second data which contains list of valid first data;

(c) determining if said first data contains an error based on said second data;

(d) accessing third data if said first data contains an error, said third data containing a probable correction of said first data;

(e) changing said first data to equate with said third data if said first data contains an error;

(f) accessing a table within a fourth data, said table indicating starting and ending memory addresses of each range of contiguous data within said fourth data;

(f) determining which of said ranges said first data is within;

(h) performing a cascaded binary search of said range to find said data which corresponds to said first data and (i) sorting said document based upon said fourth data.

2. The method of claim 1 wherein step (h) comprises:

(h.1) subtracting said starting memory address from said ending memory address to determine a range length;

(h.2) dividing said range length by two to determine a midpoint length;

(h.3) accessing a midpoint memory storage location corresponding to said starting memory address plus said midpoint length;

(h.4) terminating step (h) if said fourth data at said midpoint memory storage location is equal to said first data;

(h.5) setting said crating memory address equal to said midpoint memory address if said first data is less than said fourth data;

(h.6) setting said starting memory address equal to said midpoint memory address if said first data is greater than said fourth data; and (h.7) repeating steps (h.1) through (h.7).

3. The method of claim 1 wherein said document is an airline ticket coupon.

4. The method of claim 1 wherein step (i) uses data not found on said document to perform said sorting.

5. The method of claim 1 wherein said first data is an airline ticket number.

6. The method of claim 1 wherein said fourth data includes an airline ticket number and associated sales data.

* * * * *